June 24, 1924.

H. J. HAMER

THREAD CUTTING MACHINE

Filed Feb. 16, 1922

1,498,626

2 Sheets-Sheet 2

Patented June 24, 1924.

1,498,626

UNITED STATES PATENT OFFICE.

HOWARD J. HAMER, OF ERIE, PENNSYLVANIA, ASSIGNOR TO JARECKI MANUFACTURING COMPANY, OF ERIE, PENNSYLVANIA, A CORPORATION OF PENNSYLVANIA.

THREAD-CUTTING MACHINE.

Application filed February 16, 1922. Serial No. 536,899.

*To all whom it may concern:*

Be it known that I, HOWARD J. HAMER, a citizen of the United States, residing at Erie, in the county of Erie and State of Pennsylvania, have invented new and useful Improvements in Thread-Cutting Machines, of which the following is a specification.

It is desirable with threading machines, particularly pipe threading machines, to cut a tapered thread and it is also desirable to have means for automatically advancing the thread cutting chasers as the thread progresses so that the thread may be made longer than the width of the chasers. It is also desirable to have convenient means for adjusting the chasers to the pipe. By means of the present invention the chasers may be conveniently adjusted and they may be moved automatically to adjust them to follow the taper.

The invention is illustrated in the accompanying drawings as follows:—

Figure 1:
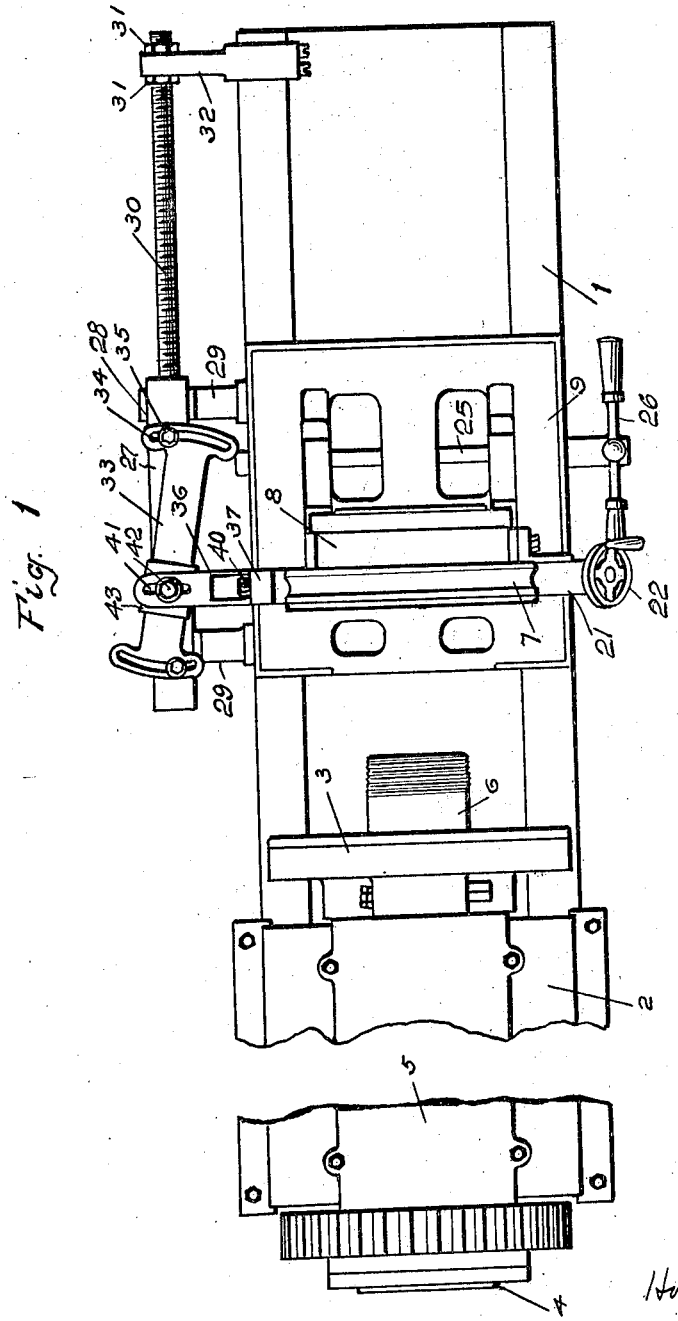

Fig. 1 shows a plan view of a threading machine.

Figure 2:
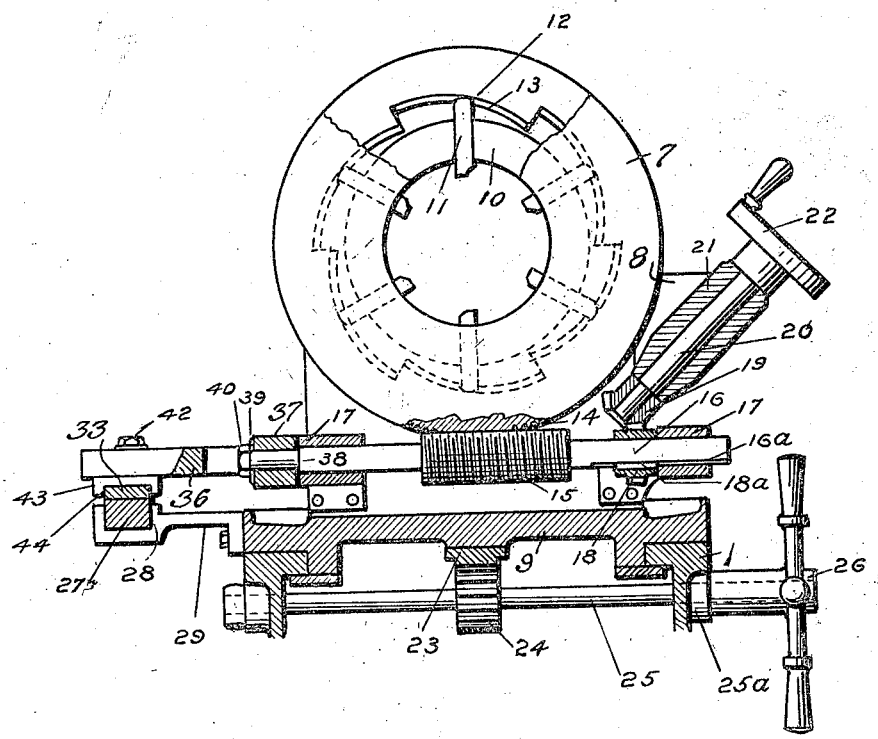

Fig. 2 a cross section of the machine.

1 marks the bed of the machine, 2 the head, 3 the pipe chuck, 4 a spindle on which the chuck is mounted, and 5 a bearing for the spindle. These are of ordinary construction. A pipe 6 is shown as secured in the chuck 3.

A die 7 is mounted on a bracket 8 extending upwardly from a carriage 9 slidingly mounted on the base or frame 1. The die has the chaser carrying head 10 in which the chasers 11 are mounted, the chasers being actuated by a cam ring 12 having a cam surface 13 in the usual manner.

The cam ring has the worm teeth 14 along the lower part of its periphery and these mesh with the worm 15. The worm 15 is arranged on a shaft 16 and the shaft 16 is journaled in bearings 17 on the carriage. A pinion 18 is slidingly mounted on the shaft 16 and locked against rotation thereon by a spline $18^a$ operating in a groove $16^a$. The pinion 18 meshes with a bevelled gear 19 and the gear 19 is fixed on a shaft 20. The shaft 20 is journaled in a bearing 21, the bearing being carried by the bracket 8. A hand wheel 22 is provided for operating the shaft 20 and consequently the shaft 16 with the worm 15.

The carriage has a rack 23 on its underside. A pinion 24 meshes with the rack 23. The pinion is fixed on a shaft 25 and the shaft is journaled in bearings $25^a$ in the frame. A hand wheel 26 is arranged on the outer end of the shaft by means of which the carriage may be moved forward to bring the die chasers into engagement with the end of a pipe. A taper attachment bar 27 is slidingly mounted in grooves 28 in brackets 29 extending from the carriage. The bar 27 is locked in position by a screw-threaded rod 30, the rod 30 extending from the bar 27 and being locked by nuts 31 with a bracket 32 carried by the frame. The position of the bar 27 may be changed by loosening the nuts 31 but in the normal operation of the machine this remains stationary. A taper bar 33 is mounted on the bar 27. It has slots 34 at each end and screws 35 extend through these slots for securing the taper bar 33 on the bar 27. A plate 36 has a shoulder 37 which is journaled on the end of the shaft 16 and locked against axial movement thereon by a shoulder 38 on the shaft and a washer 39 secured by a nut 40 on the end of the shaft. The plate 36 has a slot 41 through which a screw 42 extends into the block 43. The block 43 has a groove 44 which receives the taper bar 33.

In the operation of the machine a pipe is placed in the chuck 3 with its end adjacent to the die. The carriage is moved forward by turning the hand wheel 26. This forward movement of the carriage carries the block 43 along the plate 33 and gives some endwise movement to the worm 15 so that during this forward movement the chasers would be, so far as this movement is concerned slightly expanded. The operator may, however, simultaneously with the forward movement of the carriage operate the hand wheel 22 so as to neutralize the endwise movement of the worm and thus maintain the chasers in their inner position. In any event prior to the chasers actually engaging the pipe the operator operates the hand wheel 22 bringing the chasers to this initial position. In the usual practice the operator actuates both the wheel 26 and the wheel 22 at the same time simply maintaining the dies in their minimum position as indicated on the scale as the carriage is advanced so that the operator is relieved of any necessity of observing the moment of engagement with the pipe as this will take care of itself provided the chasers are maintained at their minimum position up to the moment of engagement. As soon as the chasers reach the end of the pipe and engage the same the action of the chasers on the pipe feeds the carriage forward. At the moment of engagement the operator releases the wheel 22 and from here on the taper attachment acting through the worm automatically expands the chasers in accordance with the taper of the pipe. The plate 33 may be adjusted so as to give the proper endwise movement to turn the cam plate the right distance to give to the chasers the desired movement with a given end movement of the carriage. The length of the taper plate gives sufficient endwise movement for the carriage bringing the dies to the pipe and the screw permits of the turning of the cam ring so as to adjust the chasers to their proper starting position regardless of the initial position on the taper plate.

What I claim as new is:—

1. In a thread cutting machine, the combination of a pipe securing head; a die comprising chasers, said die and head being relatively movable; mechanism giving relative rotative movement to the die and head; chaser actuating means; devices acting on said means as the die and head are moved relatively to automatically vary the chasers; and adjusting means manually operable as said devices are operated controlling the chasers.

2. In a thread cutting machine, the combination of a pipe securing head; a die comprising chasers and rotative actuating means for the chasers having teeth thereon; a worm acting on the teeth; means for rotating the worm; and means moving the worm endwise to actuate the first-mentioned means as the thread advances.

3. In a thread cutting machine, the combination of a pipe securing head; a die comprising chasers and a rotative cam ring controlling the chasers, said cam ring being provided with teeth; a worm engaging said teeth; and a taper attachment operating on the worm.

4. In a thread cutting machine, the combination of a pipe securing head; a die comprising chasers and a rotative cam ring controlling the chasers, said cam ring being provided with teeth; a worm engaging said teeth; a taper attachment operating on the worm; a hand wheel for operating the worm; and a manually operated device for advancing the die.

5. In a thread cutting machine, the combination of a pipe securing head; a die comprising chasers and a rotative cam ring controlling the chasers, said cam ring being provided with teeth; a worm engaging said teeth; a taper attachment operating on the worm; and means for adjusting the taper attachment to permit the adjustment of the die relatively to the head.

In testimony whereof I have hereunto set my hand.

HOWARD J. HAMER.